US010093022B2

United States Patent
Al Assad et al.

(10) Patent No.: US 10,093,022 B2
(45) Date of Patent: Oct. 9, 2018

(54) CONTROL SYSTEM AND METHOD FOR BRAKE BLEEDING

(71) Applicant: General Electric Company, Schenectady, NY (US)

(72) Inventors: Omar Al Assad, Niskayuna, NY (US); Douglas Forman, Niskayuna, NY (US); Charles Theurer, Alplaus, NY (US); Balajee Kannan, Niskayuna, NY (US); Huan Tan, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 211 days.

(21) Appl. No.: 15/058,494

(22) Filed: Mar. 2, 2016

(65) Prior Publication Data
US 2017/0174199 A1 Jun. 22, 2017

Related U.S. Application Data

(60) Provisional application No. 62/269,481, filed on Dec. 18, 2015, provisional application No. 62/269,377, (Continued)

(51) Int. Cl.
*B25J 13/00* (2006.01)
*B25J 9/16* (2006.01)
(Continued)

(52) U.S. Cl.
CPC ............ *B25J 13/003* (2013.01); *B25J 9/162* (2013.01); *B25J 9/1661* (2013.01); *B25J 9/1664* (2013.01);
(Continued)

(58) Field of Classification Search
None
See application file for complete search history.

(56) References Cited

U.S. PATENT DOCUMENTS

| 4,317,988 A | 3/1982 | Wilson |
| 6,425,282 B2 | 7/2002 | Vaughn |

(Continued)

FOREIGN PATENT DOCUMENTS

| CN | 204314083 U | 5/2015 |
| WO | 94007729 A1 | 4/1994 |

OTHER PUBLICATIONS

Liu et al.; A novel design of train air brake test instrument; Instrumentation and Measurement Technology Conference (I2MTC), IEEE; May 2010; pp. 637-640.

(Continued)

*Primary Examiner* — Joseph Schoenholtz
(74) *Attorney, Agent, or Firm* — GE Global Patent Operation; Pabitra Chakrabarti

(57) ABSTRACT

A robotic system validates brake bleeding by detecting one or more forces generated by a machine assembly acting to move a brake lever of a vehicle in order to open a valve of an air brake system of the vehicle. The system also detects displacement of the machine assembly as the machine assembly acts to move the brake lever, monitors one or more sounds generated one or more of during or after the machine assembly acts to move the brake lever, and determines that the brake lever has been moved to a position to open the valve of the air brake system to release the air brake system based on the one or more forces that are detected, the displacement that is detected, and/or the one or more sounds that are monitored.

20 Claims, 3 Drawing Sheets

Related U.S. Application Data filed on Dec. 18, 2015, provisional application No. 62/269,425, filed on Dec. 18, 2015, provisional application No. 62/269,523, filed on Dec. 18, 2015.

(51) Int. Cl.

| | | |
|---|---|---|
| *B25J 13/08* | (2006.01) | |
| *B60T 15/04* | (2006.01) | |
| *B25J 11/00* | (2006.01) | |
| *B25J 19/02* | (2006.01) | |
| *B60T 7/16* | (2006.01) | |
| *B60T 15/54* | (2006.01) | |
| *G06T 7/00* | (2017.01) | |

(52) U.S. Cl.
CPC ............ *B25J 9/1694* (2013.01); *B25J 11/00* (2013.01); *B25J 13/085* (2013.01); *B25J 19/023* (2013.01); *B60T 7/16* (2013.01); *B60T 15/048* (2013.01); *B60T 15/54* (2013.01); *G06T 7/004* (2013.01); *Y10S 901/01* (2013.01)

(56) References Cited

U.S. PATENT DOCUMENTS

| | | |
|---|---|---|
| 6,578,679 B2 | 6/2003 | Hill et al. |
| 8,880,314 B2 | 11/2014 | Peltz et al. |
| 8,924,117 B2 | 12/2014 | Kull |
| 9,085,080 B2 | 7/2015 | Mian |
| 9,799,198 B2 * | 10/2017 | Tan .................. G08B 21/18 |
| 2014/0371911 A1 * | 12/2014 | Mian .................. B25J 9/1697 |
| | | 700/259 |
| 2017/0178485 A1 * | 6/2017 | Tan .................. G08B 21/18 |

OTHER PUBLICATIONS

Liu et al.; Design and implementation of the train brake monitoring system; Control and Design Conference (CCDC), May 2011; pp. 1824-1827.

Tan et al., GE Co-pending U.S. Appl. No. 62/269,425, "Architecture and Methods of Applying Force/Torque-based Robotic Close-Loop Control in Brake Lever Grasping", filed Dec. 18, 2015.

Tan et al., GE Co-pending U.S. Appl. No. 62/269,481 "Control System and Method for Brake Bleeding" filed Dec. 18, 2015.

* cited by examiner

CONTROL SYSTEM AND METHOD FOR BRAKE BLEEDING

CROSS-REFERENCE TO RELATED APPLICATIONS

This application claims priority to U.S. Provisional Application Nos. 62/269,523; 62/269,425; 62/269,377; and 62/269,481, all of which were filed on 18 Dec. 2015, and the entire disclosures of which are incorporated herein by reference.

FIELD

The subject matter described herein relates to systems that bleed brakes of a vehicle, such as air brakes of a vehicle.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard.

In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. Use of human operators in a rail yard, however, is not without problems. The operations taking place in a rail yard pose safety risks to the human operators. Additionally, the use of human operators can involve increased cost relative to automated systems.

But, automated systems pose problems as well. Although applicant is unaware of any automated system that can bleed air brakes of a vehicle, such an automated system that pulls on a brake lever to disengage a brake system may be unreliable due to the wide variances in the brake systems among several different vehicles. For example, different vehicles may have brake levers that require different amounts of force to actuate, may have other components in locations that may be mistakenly pulled by the automated system when attempting to pull the brake lever, may have brake levers that become temporarily stuck, etc. These variances can make it difficult for an automated system to perform brake bleeding operations.

BRIEF DESCRIPTION

In one embodiment, a system (e.g., a robotic control system for validating brake bleeding) includes a force sensor detecting one or more forces generated by a machine assembly acting to move a brake lever of a vehicle in order to open a valve of an air brake system of the vehicle, an encoder detecting displacement of the machine assembly as the machine assembly acts to move the brake lever, an acoustic sensor monitoring one or more sounds generated one or more of during or after the machine assembly acts to move the brake lever, and a controller determining that the brake lever has been moved to a position to open the valve of the air brake system to release the air brake system based on the one or more forces that are detected, the displacement that is detected, and the one or more sounds that are monitored.

In one embodiment, a method (e.g., for validating brake bleeding) includes detecting one or more forces generated by a machine assembly acting to move a brake lever of a vehicle in order to open a valve of an air brake system of the vehicle, detecting displacement of the machine assembly as the machine assembly acts to move the brake lever, monitoring one or more sounds generated one or more of during or after the machine assembly acts to move the brake lever, and determining that the brake lever has been moved to a position to open the valve of the air brake system to release the air brake system based on the one or more forces that are detected, the displacement that is detected, and the one or more sounds that are monitored.

In one embodiment, a method (e.g., for validating brake bleeding) includes detecting one or more of a force generated by a machine assembly acting to move a brake lever of a vehicle in order to open a valve of an air brake system of the vehicle, displacement of the machine assembly as the machine assembly acts to move the brake lever and/or sound generated one or more of during or after the machine assembly acts to move the brake lever. The method also includes determining that the brake lever has been moved to a position to open the valve of the air brake system to release the air brake system based on one or more of the force, the displacement, and/or the sound that is detected.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
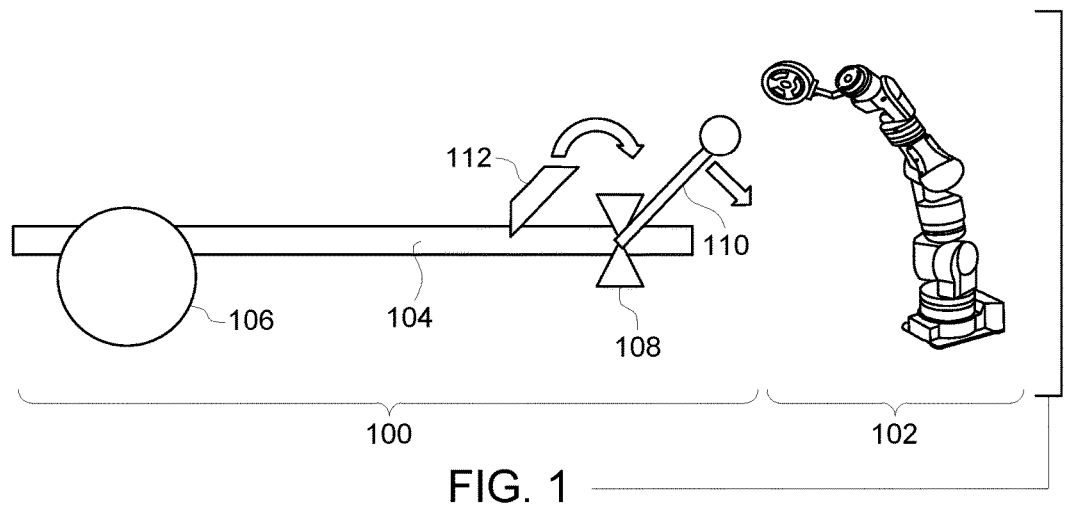
FIG. 1 schematically illustrates a brake system and a robotic control system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles and vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a brake system.

The systems and methods described herein can be used to validate a brake release action using feedback from one or more sensors. These sensors can include, but are not limited to a force and/or torque sensor installed on a robotic arm that moves a brake lever, position feedback of the robotic arm (e.g., encoders that sense displacement of the arm and/or lever), and/or acoustic measurement of the air release using one or more microphones. A computer, such as a controller, reads the sensor inputs and provides the following outputs based on the inputs: whether the brake is released (and, optionally, a confidence value or index indicative of a probability that the brake was released) and/or whether the brake was not released and (and, optionally, a confidence value or index indicative of a probability that the brake was not released). The action of pulling or pushing the brake lever can provide a direct feedback measured as an amount of lever (or rod) displacement and/or an amount of force and torque applied on the lever in several or all directions. The action of pulling or pushing the brake lever can provide an indirect feedback measured as acoustic sound of the air released via a brake valve.

The act of bleeding a brake system can be associated with a priori predicted values of these feedbacks. For example, the sensor feedback can be monitored while attempting to bleed the brake systems of a large sample of vehicles. Based on the sensor feedbacks from this sample and whether the brake systems were or were not released, the probabilities of whether a brake system on other vehicles is or is not released can be determined. For example, the measured difference between the sensor feedbacks from the sample and from a current brake system can be used to validate the brake release and provide the confidence interval (e.g., the confidence value or index). The use of the confidence value or index is used to provide an accurate estimation or validation of whether the brake system was bled. Because there are no known sensors on rail cars to indicate whether an air brake has been released, the systems and methods described herein meet a need by determining whether the air brake is released.

FIG. 1 schematically illustrates a brake system 100 and a robotic control system 102 according to one embodiment. The brake system 100 may be disposed onboard one or more vehicles, such as rail vehicles, automobiles, or the like. The brake system 100 operates on a pressure differential within one or more conduits 104 of the brake system 100. When the pressure of a fluid, such as air and/or gas, in the conduits 104 is below a designated threshold or when the pressure drops by at least a designated amount, the brake system 100 engages brakes 106 (e.g., air brakes) of the brake system 100. Although only one brake 106 is shown in FIG. 1, the brake system 100 may include several brakes 106.

The conduit 104 is connected with a valve 108 that closes to retain the fluid within the conduit 104. The valve 108 can be opened to release (e.g., bleed) the fluid out of the conduit 104 and brake system 100. Once the pressure of the fluid in the conduit 104 and brake system 100 drops by or below a designated amount, the brakes 106 of the brake system 100 release. The vehicle having the brake system 100 may then freely roll with the brakes 106 being disengaged.

The valve 108 can be actuated by moving a brake lever 110. The brake lever 110 can be pulled or pushed (e.g., actuated) to open the valve 108. Releasing the brake lever 110 may cause the valve 108 to close. A latch 112 of the brake system 100 can move under the force of a spring or other device to engage the opened valve 108 and keep the valve 108 open. For example, after pulling the brake lever 110 to open the valve 108, the latch 112 may rotate or otherwise move to a position that holds the valve 108 open. The latch 112 can keep the valve 108 open and releasing fluid until the fluid drops below a designated level (e.g., a designated pressure level) that allows the brake 106 to disengage. The brake lever 110 may then be released while the valve 108 is held open by the engaged latch 112.

In accordance with one embodiment of the inventive subject matter described herein, the robotic control system 102 may engage the brake lever 110, actuate the brake lever 110, determine if the brake lever 110 has been actuated to open the valve 108, optionally determine if the latch 112 has engaged the valve 108, and/or determine that the brakes 106 have been released (e.g., the brake system 100 has been bled to release the brakes 106) based on the force or forces applied by the robotic control system 102 to move the brake lever 110, the resulting displacement (or lack thereof) of the brake lever 110, and/or sounds generated by the brake system 100. The control system 102 optionally may provide a confidence index representative of a probability that the brake system 100 has been disengaged or released based on the force, displacement, and/or sounds. The control system 102 may implement one or more follow up actions responsive to determining that the brake system 100 has or has not been disengaged, such as by communicating with one or more human operators, attempting to release the brake system 100 again, identifying the vehicle having the brake system 100 as requiring inspection, maintenance, or repair, etc.

Figure 2:
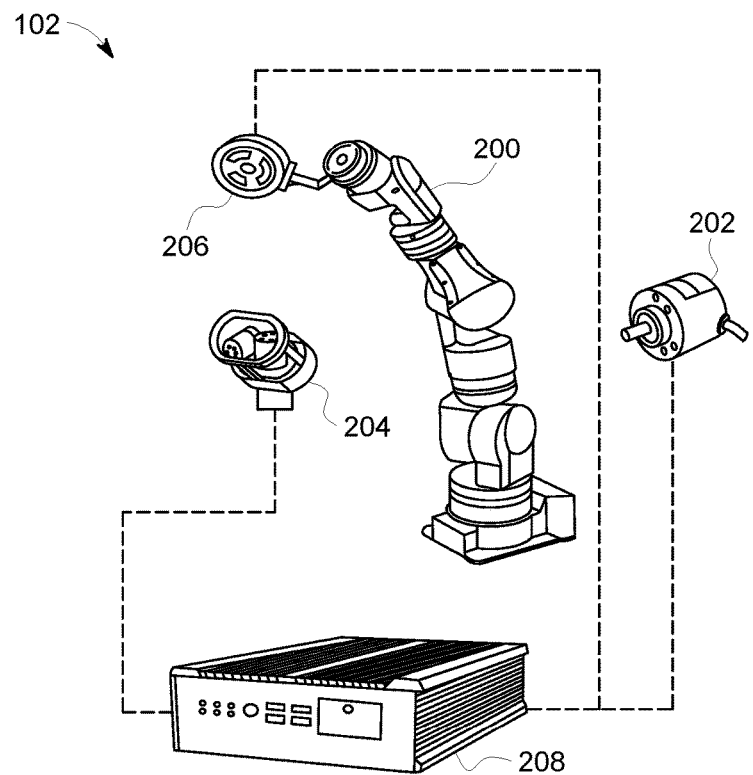
FIG. 2 illustrates one embodiment of the robotic control system shown in FIG. 1.

FIG. 2 illustrates one embodiment of the robotic control system 102 shown in FIG. 1. The control system 102 includes a robotic machine assembly 200 that moves under the direction of a controller 208. In the illustrated embodiment, the assembly 200 represents a robotic arm that moves in multiple different directions under the control of the controller 208. The controller 208 represents hardware circuitry that includes and/or is connected with one or more processors (e.g., microprocessors, field programmable gate arrays, integrated circuits, or other electronic logic-based devices). The controller 208 may include and/or be communicatively connected with one or more memories, such as computer hard drives, computer servers, etc. The controller 208 is communicatively coupled with the assembly 200 by one or more wired and/or wireless connections that allow the controller 208 to dictate how and where the assembly 200 moves. The assembly 200 can include motors or other devices that are controlled by the controller 208 to move the assembly 200.

The control system 102 includes one or more sensors 202, 204, 206 that detect operational parameters of the assembly 200 and/or the brake system 100. These operational parameters are communicated to the controller 208, which can examine the parameters to determine whether the fluid has been bled from the brake system 100 to confirm release of the brake system 100. In the illustrated example, the control system 102 includes an encoder sensor 202 that converts rotary and/or linear positions of the assembly 200 to one or more electronic signals. The encoder sensor 202 can include one or more transducers that generate the electronic signals as the assembly 200 moves. The electronic signals can represent displacement or movement of the assembly 200, and may indicate how far the brake lever 110 (shown in FIG. 1) has been moved by the assembly 200.

The control system 102 can include an acoustic sensor 204, such as one or more microphones. The acoustic sensor 204 may detect sounds generated during actuation of the brake lever 110 by the assembly 200. The sounds can be communicated to the controller 208 as electronic signals representative of the detected sounds. The control system 102 can include a force sensor 206 that detects forces and/or torques applied by the assembly 200 to the brake lever 110. The force sensor 206 optionally may be referred to as a torque sensor. The force sensor 206 may communicate electronic signals to the controller 208 that represent the sensed forces and/or torques applied by the assembly 200. Additionally or alternatively, the force sensor 206 may include a strain gauge sensor. Optionally, the control system 102 may include one or more additional or other sensors. For example, the control system 102 may include a camera that obtains images and/or video of the brake lever 110 to determine whether the brake lever 110 has been actuated to release the brake system 100. Optionally, the force sensor 206 may estimate the force or torque based on the electric current supplied to one or more motors used to move the robotic arm. For example, larger currents may represent greater forces while smaller currents may represent smaller forces.

Figure 3:
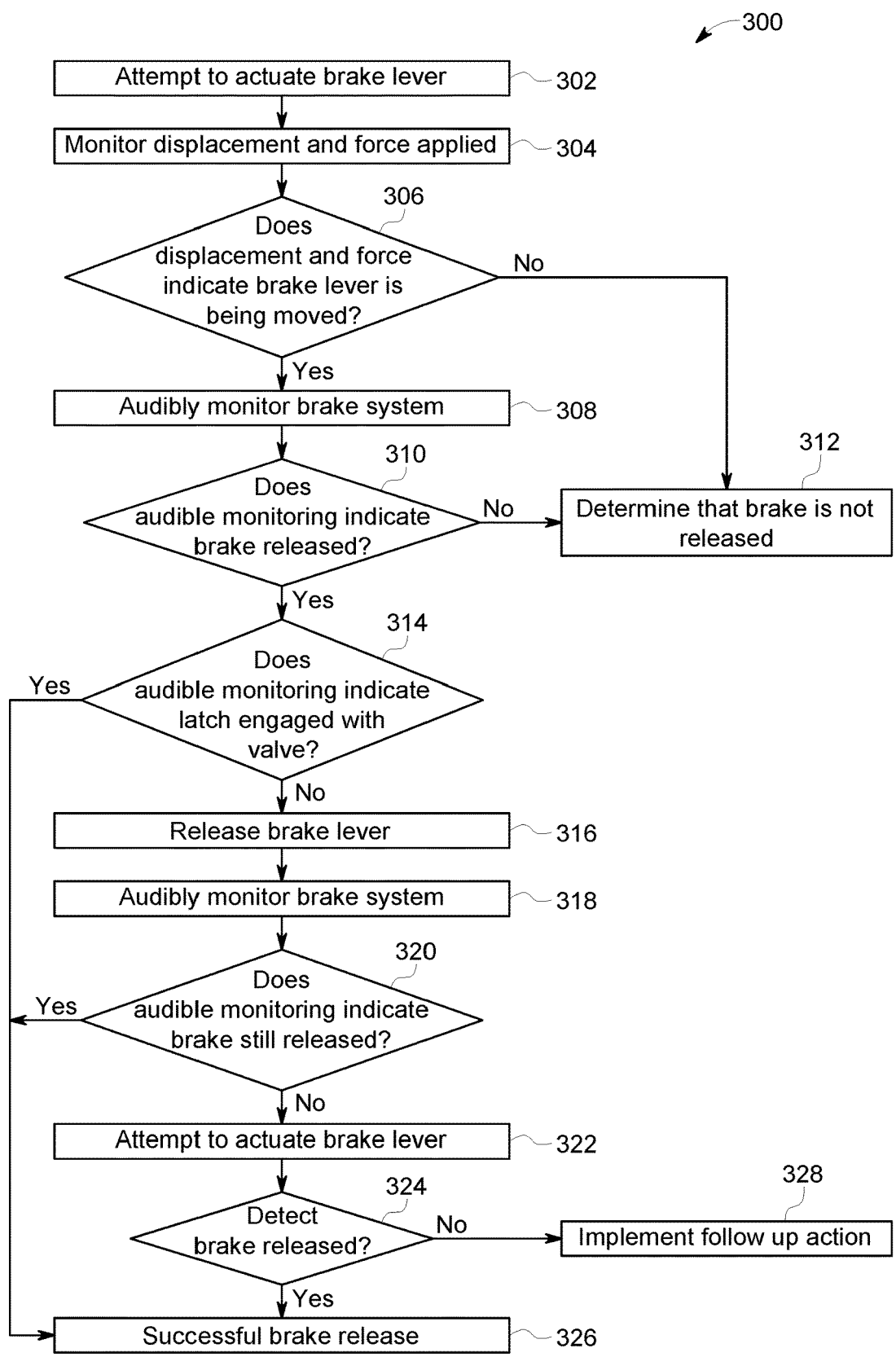
FIG. 3 illustrates a flowchart of one embodiment of a method for validating brake bleeding.

FIG. 3 illustrates a flowchart of one embodiment of a method 300 for validating brake bleeding. The method 300 may be performed by one or more embodiments of the control system 102 (shown in FIG. 1) described herein to release air brakes of a vehicle and/or to validate release of the brakes. At 302, an attempt is made to release a brake lever. The assembly 200 (shown in FIG. 2) may attempt to grasp the brake lever 110 (shown in FIG. 1) and move the brake lever 110 in a direction that opens the valve 108 (shown in FIG. 1). The assembly 200 may attempt to grasp the brake lever 110 automatically, and without intervention from a human operator.

The assembly may move toward the brake lever 110 in an attempt to grasp the brake lever 100 using one or more embodiments of the systems and methods described in U.S. Provisional Application No. 62/269,481 and/or U.S. patent application Ser. No. 15/058,423, the entire disclosures of which are incorporated by reference. These systems and methods can include automated systems that implement closed loop control of a robotic arm to locate and actuate the brake lever 100 to bleed the brake system. Even with a perception error that is relatively large, such as 2-5 cm, the error decreases as the robotic arm approaches the brake lever due to closed loop feedback from one or more sensors. The sensors can include, but are not limited to, an imaging sensor installed on the robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever, the current position and movement of the robotic arm, and/or the forces and/or torques applied by the robotic arm (as the arm moves and actuates the brake lever). The sensors provide the outputs to the computer as the robotic arm moves, and updated information is used to revise or adjust the movement of the robotic arm towards the brake lever, reducing the error between the perceived position of the brake lever relative to the position of the robotic arm. Thus, the systems and methods described herein control the robotic arm to increase the efficiency of the brake bleeding task by reducing first attempt failures to bleed the brake system without compromising speed.

The processing speed of perception information acquired by the imaging sensor may be relatively slow, such as around 0.2 Hz. In order to synchronize the perception aspect of the system with the control aspect of the system which conveys control signals to the robotic arm, one or more embodiments described herein implement a step-wise visual servo control algorithm during the brake bleeding task. For example, a motion prediction model may be used to estimate the position of the brake lever relative to the robotic arm as the robotic arm moves towards the brake lever. The motion prediction model provides feedback for closed loop control of the robotic arm. But, since the frequency of the perception is slow, the feedback information may not be available as often as required for the motion prediction model alone to be used to accurately guide the robotic arm. In one or more embodiments, an optical-flow prediction model is used as an additional environmental information source for estimating the relative position and movement between the robotic arm and the brake lever. The estimation provided by the optical-flow prediction model increases the frequency of perception and synchronizes the perception aspect of the system with the control aspect because the estimated variables of location and/or position may be used in control calculations when the slower, but more accurate, perception information is not available.

The brake lever 110 may be grasped using one or more embodiments of the grasping control systems and methods described in U.S. Provisional Application No. 62/269,425 and/or U.S. application Ser. No. 15/058,560, the entire disclosures of which are incorporated herein. The systems and methods described in these applications can include automated systems (e.g., robots) used for grasping the break lever 110. The automated systems may use feedback from one or more sensors to position a manipulator and an end-effector to grasp the break lever. These sensors may include, but are not limited to a force and/or torque sensor installed on an end-effector of the manipulator, position feedback sensors on the robotic arm (e.g., encoders that sense displacement of an arm and/or lever), a peripheral sensor, and/or the like. A computer, such as a controller, reads the sensor inputs and adjusts a position and/or orientation of the end-effector based on the sensor inputs. The controller may continually adjust in real-time the position and/or orientation of the end-effector to enable the automated system to firmly grasp the brake lever. Based on the sensor inputs the controller may generate a plurality of closed loops to control movement and/or drive the manipulator and the end-effector. The sensor inputs may be utilized by the controller as feedback information relating to the automated system and the environment (e.g., area surrounding the automated system, task space) to adjust the manipulator and/or the end-effector. For example, as the end-effector is positioned approximate to and/or grasping the brake lever the controller may receive sensor inputs by the force and/or torque sensor corresponding to an amount of pressure (e.g., force, torque) applied to the end-effector while in contact with the brake lever. The controller may continually adjust a position and/or orientation of the end-effector until the controller validates or confirms the grasp based on the measured pressure is within a predetermined threshold of an appropriate grasp.

Returning to the description of the method 300 shown in FIG. 3, at 304, displacement of the control assembly and/or force applied by the control assembly are monitored. The displacement of the control assembly 200 during pulling or pushing of the brake lever 110 can be monitored by the controller 208 (shown in FIG. 2) tracking the signals provided by the encoder sensor 202 (shown in FIG. 2). Alternatively, the displacement may be monitored based on feedback from motors of the assembly 200, such as by monitoring electric signals input to and/or output from electronic motors that move different parts of the assembly 200. The force applied by the assembly 200 can be monitored by tracking the signals provided by the force sensor 206. The forces that are monitored can include the torque applied by the assembly 200 to move the brake lever 110.

At 306, a determination is made as to whether the force and/or displacement indicate that the brake lever is or was moved. The force and displacement can be examined to determine whether the brake lever 110 has moved, or whether the brake lever 110 has not moved or another component of the vehicle was moved. In one embodiment, a force/displacement profile of the assembly 200 may be examined by the controller 208 to determine if the brake lever has moved.

Figure 4:
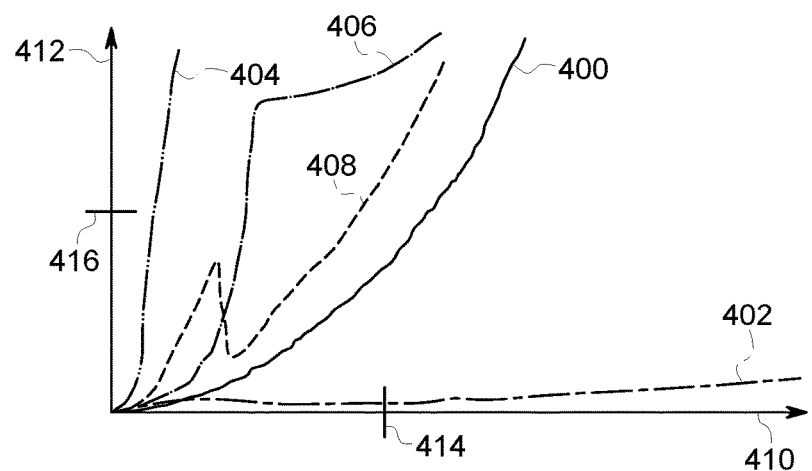
FIG. 4 illustrates several force/displacement profiles according to several examples.

FIG. 4 illustrates several force/displacement profiles 400, 402, 404, 406, 408 according to several examples. The force/displacement profiles 400, 402, 404, 406, 408 are shown alongside a horizontal axis 410 representative of displacement (e.g., distance that the assembly 200 shown in FIG. 2 is moved while trying to release the brake system 100 shown in FIG. 1) and a vertical axis 412 representative of forces (e.g., applied by the assembly 200 while trying to release the brake system 200).

The controller 208 (shown in FIG. 2) can examine the forces and displacements reported by the sensors 202, 206 (shown in FIG. 2) to determine if the assembly 200 has moved the brake lever 110 (shown in FIG. 1) and if the assembly 200 has moved the brake lever 110 by a sufficient distance to open the valve 108 (shown in FIG. 1). With respect to the force/displacement profile 400, the controller 208 may determine that the forces applied by the assembly 200 increase with respect to displacement of the assembly 200, and that the magnitude of the forces and displacement are sufficiently large to represent movement of the brake lever 110 sufficiently far to open the valve 108 (shown in FIG. 1). For example, the controller 208 may compare the displacement of the profile 400 with a designated, non-zero displacement threshold 414. The displacement threshold 414 can represent a distance that the brake lever 110 may need to be moved in order to open or at least partially open the valve 108. The controller 208 also may compare the forces of the profile 400 with a designated, non-zero force threshold 416. The force threshold 416 can represent a force that may need to be applied to move the brake lever 110 to open or at least partially open the valve 108.

The thresholds 414, 416 can be determined from the sensor feedback obtained while previously attempting to bleed the brake systems of a sample of vehicles. Based on the forces and displacements monitored from this sample and whether the brake systems were or were not released, the thresholds 414, 416 may be determined. Alternatively, the thresholds 414, 416 may be manually established or otherwise determined.

The thresholds 414, 416 may be used to determine whether the assembly 200 is moving the brake lever 110 or another component of the vehicle. For example, if the controller 208 determines that the assembly 200 moves a distance at least as far as the displacement threshold 414, but that the forces applied by the assembly 200 are less than the force threshold 416, then the forces and displacement may indicate that the assembly 200 is moving another component of the vehicle, such as a cable, wire, or the like. The force/displacement profile 402 represents such a scenario where the assembly 200 moves some object a distance that is farther than the displacement threshold 414, but where a relatively small force is applied by the assembly 200 to move the object (e.g., the applied force is less than the force threshold 416). This can indicate that the assembly 200 is moving an object other than the brake lever 110. As a result, the controller 208 determines that the assembly 200 is not moving the brake lever 110.

As another example, if the controller 208 determines that the assembly 200 applies forces that are at least as large as the force threshold 416, but that the assembly 200 moves the object a distance that is less than the displacement threshold 414, then the forces and displacement may indicate that the assembly 200 is not moving the brake lever 110 sufficiently far or is moving another component of the vehicle. The force/displacement profile 404 represents such a scenario where the assembly 200 moves some object a distance that is shorter than the displacement threshold 414, but where a relatively large force is applied by the assembly 200 to move the object (e.g., the applied force is at least as great as the force threshold 416). This can indicate that the assembly 200 is applying a large force to the object, but that the object is not moving very far. For example, the assembly 200 may be attempting to move a brake lever 110 that is stuck and unable to open the valve 108, or that the assembly 200 is moving an object other than the brake lever 110. As a result, the controller 208 determines that the assembly 200 is not moving the brake lever 110 to open the valve 108.

In another example, the brake lever 110 may become hung or temporarily stuck in a position. The force/displacement profile 408 represents such a scenario where the assembly 200 moves the lever 110 and the lever 110 becomes stuck or hung in location. The assembly 200 increases the force applied to the lever 110 before the lever 110 is released and continues moving to open the valve 108. As shown in FIG. 4, the controller 208 can examine the forces and displacement and determine that both are sufficiently large to determine that the lever 110 is being moved to open the valve 108.

In another example, the brake lever 110 may be more difficult to move for part of the range of motion of the lever 110, and then easier to move. This may occur where part of the lever 110 or gearing connected with the lever 110 has become worn or damaged. The force/displacement profile 406 represents such a scenario. The assembly 200 applies a force that increases at a relatively fast rate for a first portion of the displacement of the lever 110. Then force applied to the lever 110 than increases, but at a slower rate. The controller 208 can examine the forces and displacement and determine that both are sufficiently large to determine that the lever 110 is being moved to open the valve 108.

Returning to the description of the method 300 shown in FIG. 3, at 306, if the forces and displacement measured by the sensors in the control system indicate that the brake lever is being moved to open the valve, then the method 300 can proceed to validate that the valve is being opened and the air being bled from the brake system. As a result, flow of the method 300 can proceed toward 308. If the forces and displacement measured by the sensors in the control system do not indicate that the brake lever is being moved to open the valve, then the method 300 can proceed to determine that the valve is not being opened and the air is not being bled from the brake system. As a result, flow of the method 300 can proceed toward 312.

At 308, the brake system is audibly monitored. For example, the acoustic sensor 204 (shown in FIG. 2) may monitor sounds generated by the brake system 100. Electronic signals representative of these sounds may be generated by the acoustic sensor 204 and communicated to the controller 208. At 310, a determination is made as to whether the sounds sensed during the acoustic monitoring indicate that the brake system has been or is being released, such as by the air being bled out of the brake system. This determination may be made by determining if the sounds indicate the air flowing out of the brake system 100, such as through the valve 108.

Figure 5:
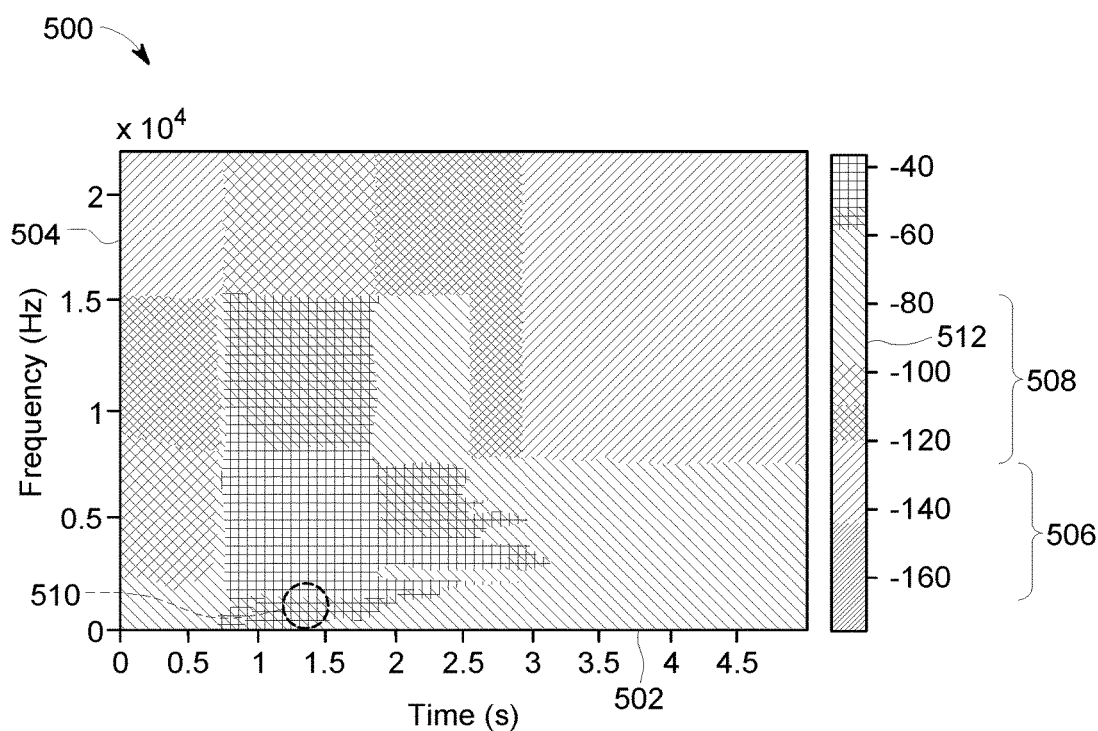
FIG. 5 illustrates one example of an acoustic signature representative of sounds sensed by the acoustic sensor shown in FIG. 2 during opening of the valve shown in FIG. 1 of the brake system also shown in FIG. 1.

FIG. 5 illustrates one example of an acoustic signature 500 representative of sounds sensed by the acoustic sensor 204 shown in FIG. 2 during opening of the valve 108 shown in FIG. 1 of the brake system 100 also shown in FIG. 1. The acoustic signature 500 is shown alongside a horizontal axis 502 representative of time and a vertical axis 504 representative of frequencies of the detected sounds. A legend 512 represents the decibel level of the different frequencies of the detected sounds shown in the signature 500.

The controller 208 (shown in FIG. 2) may examine the sounds represented by the signature 500 to determine if the brake lever 110 (shown in FIG. 1) has been actuated to open the valve 108 (shown in FIG. 1) and/or to determine if the latch 112 (shown in FIG. 1) of the brake system 100 has actuated to engage the valve 108. In one embodiment, the controller 208 may determine if there is a change in the detected sounds after the brake lever 110 is actuated. For example, if the brake lever 110 is moved at a time occurring between zero to 0.75 seconds, inclusive, then the controller 208 may determine whether the detected sounds change thereafter. In the signature 500, the sounds change at approximately 0.75 seconds, with a higher frequency component 508 and a lower frequency component 506 of the sounds being detected. Based on a comparison to the acoustic signatures or sounds detected in the previously examined sample of brake systems, the controller 208 can determine that the higher frequency component 508 and/or the lower frequency component 510 occur when the air in the brake system 100 flows out of the brake system 100. For example, the sounds represented by one or more of the components 508, 510 can represent the "hissing" sound that occurs when the air flows out through the valve 108.

Returning to the description of the method 300 shown in FIG. 3, at 310, the controller may then determine that the brake system has been released. As a result, flow of the method 300 can proceed toward 314. But, if the detected sounds do not indicate that the brake system has been released (e.g., the high and/or low frequency components 308, 310 are not detected), then the controller may determine that the brake system has not been released. As a result, flow of the method 300 can proceed toward 312.

At 312, it is determined that the brake system has not been released. For example, due to an insufficient force being applied to move the brake lever 110, the brake lever 110 not being moved sufficiently far, and/or the failure to audibly detect air flowing out of the brake system 100, the controller 208 may determine that the brake system 100 has not been released. Flow of the method 300 can return toward 302, or may terminate.

At 314, a determination is made as to whether the detected sounds indicate that the latch of the brake system has moved to engage the valve (and hold the valve open). In the acoustic signature 500 shown in FIG. 5, a "pop" sound 510 is detected at a time before 1.5 seconds along the horizontal axis 502. This sound 510 may have a frequency within a designated range of frequencies, such as 600 to 800 Hz, or another frequency. The designated range of frequencies may be determined from the sample of vehicles described herein. For example, the sounds detected when the latches in the vehicles in the sample may be used to determine the range of frequencies in which the sounds are detected.

If the controller 208 detects the sound 510 representative of the latch 112 moving to engage the valve 108 after movement of the brake lever 110, then the controller 208 can determine that the latch 112 is engaged with and is holding the valve 108 open. As a result, flow of the method 300 can proceed toward 326. But, if the controller 208 does not detect the sound 510 representative of the latch 112 moving to engage the valve 108 after movement of the brake lever 110, then the controller 208 may not determine that the latch 112 is engaged with and is holding the valve 108 open. As a result, flow of the method 300 can proceed toward 316.

At 316, the brake lever is released. For example, responsive to determining that the detected sounds do not indicate that the latch 112 has engaged the valve 108, the controller 208 may direct the assembly 200 to release the brake lever 110 to determine if the sounds representative of the air flowing out of the brake system 100 continue to be sensed. The controller 208 may direct the assembly 200 to release the brake lever 110 because the sound of the air rushing out of the brake system 100 may hide or mask the sound of the latch 112 engaging the valve 108. Releasing the brake lever 110 can allow the controller 208 to determine if air continues to flow out of the brake system 100, which may indicate that the latch 112 is holding the valve 108 open.

At 318, the brake system is audibly monitored. For example, the acoustic sensor 204 may monitor sounds generated by the brake system 100. Electronic signals representative of these sounds may be generated by the acoustic sensor 204 and communicated to the controller 208. At 320, a determination is made as to whether the sounds sensed during the acoustic monitoring indicate that the brake system is still being released. For example, the controller 208 can examine the sensed sounds to determine if air is still flowing out of the brake system 100 (e.g., through the valve 108) even after the brake lever 110 is released (e.g., at 316). If the sounds indicate that the brake system is still being released (e.g., the higher and/or lower frequency components 308, 310 are detected), then it may be determined (e.g., by the controller) that the brake system is still released. As a result, flow of the method 300 can proceed toward 326. But, if the detected sounds do not indicate that the brake system is still being released (e.g., the higher and/or lower frequency components 308, 310 are not detected), then the controller may determine that the brake system has not been released. As a result, flow of the method 300 can proceed toward 322.

At 322, another attempt to actuate the brake lever may be performed. As described above, the controller 208 can direct the assembly 200 to actuate the brake lever 110. At 324, a determination is made as to whether the brake lever has been actuated to release the brake system. For example, the controller 208 can monitor the forces and/or displacement of the brake lever 110 to determine if the brake lever 110 has been actuated, as described above. The controller 208 optionally can monitor the sounds to determine if the sounds indicate that the brake has been released, also as described above. If the forces, displacement, and/or sounds indicate release of the brake, then flow of the method 300 can proceed toward 326. Otherwise, flow of the method 300 can proceed toward 328.

At 326, it is determined that the brake has been successfully released. For example, the controller 208 can determine that the air in the brake system 100 has been evacuated from the brake system 100 by an amount sufficient to disengage the brakes 106 (shown in FIG. 1) so that the vehicle can freely roll along a route or track. The controller 208 can communicate a signal to an output device, such as a display device, speaker, or the like, to indicate that the brake has been successfully released. Optionally, the controller 208 can communicate a signal to automatically start one or more processes on the vehicle, such as an inspection, maintenance, or repair of the vehicle that requires the brake system to be released.

At 328, one or more follow up actions are implemented. For example, the controller 208 can communicate a signal to an output device to inform one or more human operators to notify the operators of the failure to release the brake system. Optionally, the controller 208 may attempt to release the brake system 100 again. In another example, the controller 208 can communicate a signal to an output device that identifies the vehicle having the brake system 100 as requiring inspection, maintenance, or repair.

Information about the state or condition of the brake or brake lever (e.g., successful or unsuccessful release of the brake or movement of the brake lever 110) may be communicated using one or more of the systems and methods described in U.S. Provisional Application No. 62/269,377 and/or U.S. patent application Ser. No. 15/058,368, the entire disclosures of which are incorporated by reference. The information may be communicated through a system interface that includes hardware and software for communicating the information. For example, the system interface may include a collection of different physical units, such as user displays, light sources, and audio-generating devices (e.g., speakers, horns, and the like). The information may be in the form of visual signals, audible signals, or tactile signals. Visual signals include signals that may be viewed by a human operator or visually detected by a system. The visual signals may be provided by, for example, a user display of the control system, which may be carried by the operator or carried by the control system. The user display may present different screens to the user. Visual signals may also be provided by a light source or light sources. For example, a green light may indicate that the environment is safe for performing a task, whereas a red light may indicate that the control system must stop performing the task. In some cases, the visual signals may include gestures performed by a robot.

Audible signals include signals that may be heard by a human operator or audibly detected by a system. The audible signals may be provided by an audio-generating device (e.g., speaker, horn, and the like). Similar to the visual signals, the audible signals may provide explicit information in a recognizable language (e.g., human or simulated voice that states "train is 10 meters away") or may provide sounds that represent information more abstractly. For example, an arrangement of beeps may indicate that the task is complete. A series of beeps may indicate that an object is approaching. Tactile signals are signals that may be touched by a human operator or sensed by a system. The tactile signals may include, for example, vibrations or predetermined movements of a mechanical component sensed by the operator.

Each communication may convey different information. The fused ensemble may be provided by a single device (e.g., user display) or provided by multiple devices (e.g., user display and speaker). Accordingly, a fused ensemble may include a plurality of different types of communications (e.g., audio, visual, tactile). The plurality of communications of a fused ensemble may be provided simultaneously, concurrently, within a limited time period from each other (e.g., less than ten seconds), or during the same time period in which the control system has a designated operative state. The fused ensemble may be dynamic and can change while the machine is in an operative state. The change may be based on environmental data received by the control system.

In one embodiment, a method (e.g., for validating brake bleeding) includes detecting one or more forces generated by a machine assembly acting to move a brake lever of a vehicle in order to open a valve of an air brake system of the vehicle, detecting displacement of the machine assembly as the machine assembly acts to move the brake lever, monitoring one or more sounds generated one or more of during or after the machine assembly acts to move the brake lever, and determining that the brake lever has been moved to a position to open the valve of the air brake system to release the air brake system based on the one or more forces that are detected, the displacement that is detected, and the one or more sounds that are monitored.

In one example, determining that the brake lever has been moved to the position to open the valve includes determining whether both the displacement exceeds a designated position threshold and the one or more forces exceed a designated force threshold.

In one example, determining that the brake lever has been moved to the position to open the valve includes determining whether the one or more sounds indicate air flowing out of the valve of the brake system.

In one example, the method also includes determining whether a latch of the brake system has moved to engage the valve to hold the valve open based on the one or more sounds that are monitored.

In one example, the method also includes directing the machine assembly to release the brake lever responsive to determining that the latch has not moved to engage the valve, monitoring one or more additional first sounds generated subsequent to directing the machine assembly to release the brake lever, and determining that the latch has moved to engage the valve to hold the valve open based on the one or more additional first sounds.

In one example, the method also includes directing the machine assembly to again act to move the brake lever, detecting one or more additional forces generated by the machine assembly acting to move the brake lever, detecting additional displacement of the machine assembly as the machine assembly acts to move the brake lever, monitoring one or more additional second sounds generated one or more of during or after the machine assembly acts to move the brake lever, and determining that the brake lever has been moved to the position to open the valve of the air brake system to release the air brake system based on the one or more additional forces that are detected, the additional displacement that is detected, and the one or more additional second sounds that are monitored.

In one embodiment, a system (e.g., a robotic control system for validating brake bleeding) includes a force sensor detecting one or more forces generated by a machine assembly acting to move a brake lever of a vehicle in order to open a valve of an air brake system of the vehicle, an encoder detecting displacement of the machine assembly as the machine assembly acts to move the brake lever, an acoustic sensor monitoring one or more sounds generated one or more of during or after the machine assembly acts to move the brake lever, and a controller determining that the brake lever has been moved to a position to open the valve of the air brake system to release the air brake system based on the one or more forces that are detected, the displacement that is detected, and the one or more sounds that are monitored.

In one example, the controller determines that the brake lever has been moved to the position to open the valve by determining whether both the displacement exceeds a designated force threshold and the one or more forces exceed a designated force threshold.

In one example, the controller determines that the brake lever has been moved to the position to open the valve by determining whether the one or more sounds indicate air flowing out of the valve of the brake system.

In one example, the controller also determines whether a latch of the brake system has moved to engage the valve to hold the valve open based on the one or more sounds that are monitored.

In one example, the controller directs the machine assembly to release the brake lever responsive to determining that the latch has not moved to engage the valve, the acoustic sensor monitors one or more additional first sounds generated subsequent to directing the machine assembly to release the brake lever, and the controller determines that the latch has moved to engage the valve to hold the valve open based on the one or more additional first sounds.

In one example, the controller directs the machine assembly to again act to move the brake lever, the force sensor detects one or more additional forces generated by the machine assembly acting to move the brake lever, the encoder detects additional displacement of the machine assembly as the machine assembly acts to move the brake lever, the acoustic sensor monitors one or more additional second sounds generated one or more of during or after the machine assembly acts to move the brake lever, and the controller determines that the brake lever has been moved to the position to open the valve of the air brake system to release the air brake system based on the one or more additional forces that are detected, the additional displacement that is detected, and the one or more additional second sounds that are monitored.

In one embodiment, a method (e.g., for validating brake bleeding) includes detecting one or more of a force generated by a machine assembly acting to move a brake lever of a vehicle in order to open a valve of an air brake system of the vehicle, displacement of the machine assembly as the machine assembly acts to move the brake lever and/or sound generated one or more of during or after the machine assembly acts to move the brake lever. The method also includes determining that the brake lever has been moved to a position to open the valve of the air brake system to release the air brake system based on one or more of the force, the displacement, and/or the sound that is detected.

In one example, determining that the brake lever has been moved to the position to open the valve is based on all of the force, the displacement, or the sound that is detected.

In one example, determining that the brake lever has been moved to the position to open the valve includes determining whether both the displacement exceeds a designated position threshold and the force exceeds a designated force threshold.

In one example, determining that the brake lever has been moved to the position to open the valve includes determining whether the sound indicates air flowing out of the valve of the brake system.

In one example, the method also includes determining whether a latch of the brake system has moved to engage the valve to hold the valve open based on the sound that is monitored.

In one example, determining whether the latch has moved to engage the valve includes determining whether the sound includes a portion having a frequency within a designated range of frequencies.

In one example, the method also includes directing the machine assembly to release the brake lever responsive to determining that the latch has not moved to engage the valve, monitoring one or more additional first sounds generated subsequent to directing the machine assembly to release the brake lever, and determining that the latch has moved to engage the valve to hold the valve open based on the one or more additional first sounds.

In one example, the method also includes directing the machine assembly to again act to move the brake lever, detecting one or more additional forces generated by the machine assembly acting to move the brake lever, detecting additional displacement of the machine assembly as the machine assembly acts to move the brake lever, monitoring one or more additional second sounds generated one or more of during or after the machine assembly acts to move the brake lever, and determining that the brake lever has been moved to the position to open the valve of the air brake system to release the air brake system based on the one or more additional forces that are detected, the additional displacement that is detected, and the one or more additional second sounds that are monitored.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   a force sensor detecting one or more forces generated by a machine assembly acting to move a brake lever of a vehicle in order to open a valve of an air brake system of the vehicle;
   an encoder detecting displacement of the machine assembly as the machine assembly acts to move the brake lever;
   an acoustic sensor monitoring one or more sounds generated during or after the machine assembly acts to move the brake lever; and
   a controller determining that the brake lever has been moved to a position to open the valve of the air brake system to release the air brake system based on the one or more forces that are detected, the displacement that is detected, and the one or more sounds that are monitored.

2. The system of claim 1, wherein the force sensor includes a torque sensor.

3. The system of claim 1, wherein the force sensor includes a strain gauge sensor that detects the one or more forces based on a measured strain.

4. The system of claim 1, wherein the force sensor detects the one or more forces based on an electric current supplied to one or more motors that move the machine assembly.

5. The system of claim 1, wherein the controller determines that the brake lever has been moved to the position to open the valve by determining whether both the displacement exceeds a designated force threshold and the one or more forces exceed a designated force threshold.

6. The system of claim 1, wherein the controller determines that the brake lever has been moved to the position to open the valve by determining whether the one or more sounds indicate air flowing out of the valve of the brake system.

7. The system of claim 1, wherein the controller also determines whether a latch of the brake system has moved to engage the valve to hold the valve open based on the one or more sounds that are monitored.

8. The system of claim 7, wherein the controller directs the machine assembly to release the brake lever responsive to determining that the latch has not moved to engage the valve, the acoustic sensor monitors one or more additional first sounds generated subsequent to directing the machine assembly to release the brake lever, and the controller determines that the latch has moved to engage the valve to hold the valve open based on the one or more additional first sounds.

9. The system of claim 8, wherein the controller directs the machine assembly to again act to move the brake lever, the force sensor detects one or more additional forces generated by the machine assembly acting to move the brake lever, the encoder detects additional displacement of the machine assembly as the machine assembly acts to move the brake lever, the acoustic sensor monitors one or more additional second sounds generated during or after the machine assembly acts to move the brake lever, and the controller determines that the brake lever has been moved to the position to open the valve of the air brake system to release the air brake system based on the one or more additional forces that are detected, the additional displacement that is detected, and the one or more additional second sounds that are monitored.

10. A method comprising:
    detecting one or more forces using a force sensor, generated by a machine assembly acting to move a brake lever of a vehicle in order to open a valve of an air brake system of the vehicle;
    detecting displacement using an encoder, of the machine assembly as the machine assembly acts to move the brake lever;
    monitoring one or more sounds using an acoustic sensor, generated during or after the machine assembly acts to move the brake lever; and
    determining using a controller, that the brake lever has been moved to a position to open the valve of the air brake system to release the air brake system based on the one or more forces that are detected, the displacement that is detected, and the one or more sounds that are monitored.

11. The method of claim 10, wherein determining that the brake lever has been moved to the position to open the valve includes determining whether both the displacement exceeds a designated position threshold and the one or more forces exceed a designated force threshold.

12. The method of claim 10, wherein determining that the brake lever has been moved to the position to open the valve includes determining whether the one or more sounds indicate air flowing out of the valve of the brake system.

13. The method of claim 10, further comprising determining using the acoustic sensor, whether a latch of the brake system has moved to engage the valve to hold the valve open based on the one or more sounds that are monitored.

14. The method of claim 13, further comprising:
    directing the machine assembly to release the brake lever responsive to determining that the latch has not moved to engage the valve;
    monitoring one or more additional first sounds generated subsequent to directing the machine assembly to release the brake lever; and
    determining that the latch has moved to engage the valve to hold the valve open based on the one or more additional first sounds.

15. The method of claim 14, further comprising:
directing the machine assembly to again act to move the brake lever;
detecting one or more additional forces generated by the machine assembly acting to move the brake lever;
detecting additional displacement of the machine assembly as the machine assembly acts to move the brake lever;
monitoring one or more additional second sounds generated during or after the machine assembly acts to move the brake lever; and
determining that the brake lever has been moved to the position to open the valve of the air brake system to release the air brake system based on the one or more additional forces that are detected, the additional displacement that is detected, and the one or more additional second sounds that are monitored.

16. A method comprising:
detecting one or more of:
a force using a force sensor, generated by a machine assembly acting to move a brake lever of a vehicle in order to open a valve of an air brake system of the vehicle;
displacement using an encoder, of the machine assembly as the machine assembly acts to move the brake lever; or
sound using an acoustic sensor, generated during or after the machine assembly acts to move the brake lever; and
determining using a controller, that the brake lever has been moved to a position to open the valve of the air brake system to release the air brake system based on one or more of the force, the displacement, or the sound that is detected.

17. The method of claim 16, wherein determining that the brake lever has been moved to the position to open the valve is based on all of the force, the displacement, or the sound that is detected.

18. The method of claim 16, wherein determining that the brake lever has been moved to the position to open the valve includes determining whether both the displacement exceeds a designated position threshold and the force exceeds a designated force threshold.

19. The method of claim 16, wherein determining that the brake lever has been moved to the position to open the valve includes determining whether the sound indicates air flowing out of the valve of the brake system.

20. The method of claim 16, further comprising determining using the acoustic sensor, whether a latch of the brake system has moved to engage the valve to hold the valve open based on the sound that is monitored.

* * * * *